Aug. 12, 1924.  1,504,516
A. SCHMECHEL ET AL
SUPPORTING AND DRIVING ATTACHMENT FOR MOTOR DRIVEN VEHICLES
Filed May 12, 1923   4 Sheets-Sheet 4
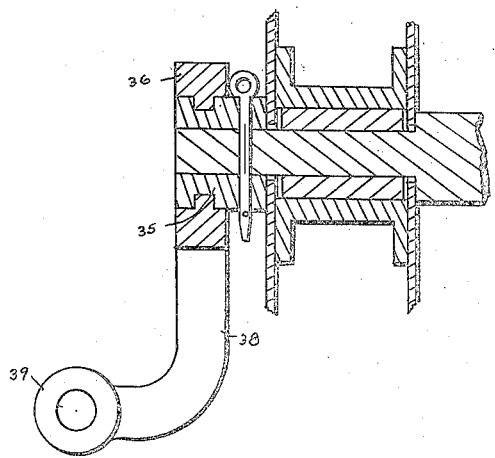
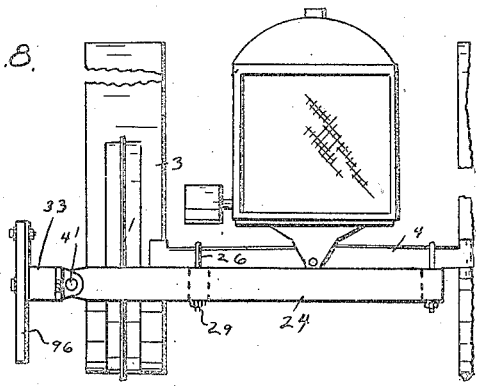
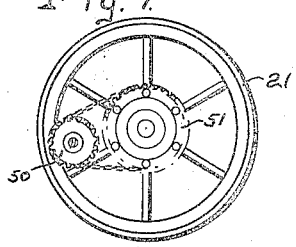
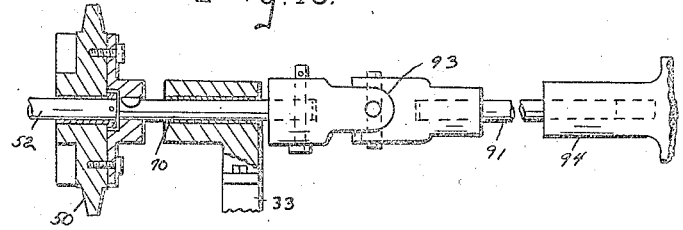
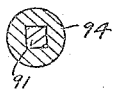
INVENTORS
Arno Schmechel
George Schubert
By Erwin Wheeler & Woolard
ATTORNEYS Patented Aug. 12, 1924.

1,504,516

UNITED STATES PATENT OFFICE.

ARNO SCHMECHEL AND GEORGE SCHUBERT, OF THIENSVILLE, WISCONSIN.

SUPPORTING AND DRIVING ATTACHMENT FOR MOTOR-DRIVEN VEHICLES.

Application filed May 12, 1923. Serial No. 638,581.

*To all whom it may concern:*

Be it known that we, ARNO SCHMECHEL and GEORGE SCHUBERT, citizens of the United States, residing at Thiensville, county of Ozaukee, and State of Wisconsin, have invented new and useful Improvements in Supporting and Driving Attachments for Motor-Driven Vehicles, of which the following is a specification.

Our invention relates to improvements in supporting and driving auxiliary attachments for motor driven vehicles whereby such vehicles may be more efficiently utilized to propel and operate auxiliary machines.

The object of this invention is to provide means whereby a motor driven vehicle such, for example, as a tractor, may be utilized to propel and operate a laterally connected auxiliary machine such as a corn harvester without materially interfering with the controlling and steering operations of the tractor.

Where auxiliary wheel supported machines are to be operated from a tractor, it is frequently necessary or desirable to connect such machines laterally, i. e., at one side of the tractor, whereby the operator may inspect the working of the auxiliary machine and whereby said auxiliary machine may operate upon material along a line at one side of the tractor. For example, where the tractor is utilized to operate a corn harvester, it is very desirable that the harvester operate along a row of standing corn before the tractor passes over it and it is practically impossible to attach such a harvesting machine in front of the tractor, because, when so attached, it is very difficult to control and it is also impossible for the driver of the tractor to watch the operation and accurately direct the movement of the harvesting machine in such a manner as to gather up lodged cornstalks and successfully harvest the corn by cutting and binding the stalks.

On the other hand, attempts heretofore made to attach such auxiliary machines at one side of a tractor and to operate them from the tractor motor have greatly increased the difficulty of controlling and steering the tractor by reason of the added resistance or unbalanced load imposed upon that side of the tractor to which the auxiliary machine is attached.

The invention herein disclosed is largely based upon the discovery that by connecting the auxiliary machine to one end of the rear axle of the tractor for propelling purposes and driving the working parts of the auxiliary machine from the other end of the rear axle, the load imposed upon the tractor may be balanced sufficiently to practically eliminate the difficulty above referred to. By our invention, we are enabled to largely balance the resistance imposed upon the respective traction wheels of the tractor by the auxiliary machine, thereby substantially eliminating the tendency heretofore encountered for one of the traction wheels to slow down, with a corresponding increasing speed of revolution in the other one, due to the action of the differential gears.

More specifically stated, therefore, objects of this invention are to provide means whereby an auxiliary machine may be propelled from one end of the rear axle of the tractor and its working parts driven from the other end of such axle; also to provide a tractor with a detachable sub-frame to facilitate connecting the auxiliary machine at one side of the tractor and to support the driving connections for operating the auxiliary machine; also to provide means whereby the auxiliary machine may be quickly disconnected from the tractor without disconnecting said detachable sub-frame; also to provide a special form of wheeled support for the detachable sub-frame and the auxiliary machine whereby the auxiliary machine when detached may be drawn by other power as an independent wheeled vehicle and supported with its working parts out of contact with the ground; also to provide the detachable sub-frame with cooperating members hereinafter to be described whereby the operation of the auxiliary machine may be facilitated.

In the drawings:

Fig. 7 is a fragmentary view in vertical section drawn to the same plane as Fig. 3 but showing a modified form of construction.

Fig. 8 is a front elevation of a portion of the tractor showing the detachable subframe and the means for connecting the auxiliary machine thereto at the front end of the tractor.

Fig. 9 is a side view of the bull-wheel 21 and its driving sprocket wheel 51 in relation to sprocket wheel 50.

Fig. 10 is an enlarged detail view of the coupling shaft 70 and associated parts.

Figure 1:
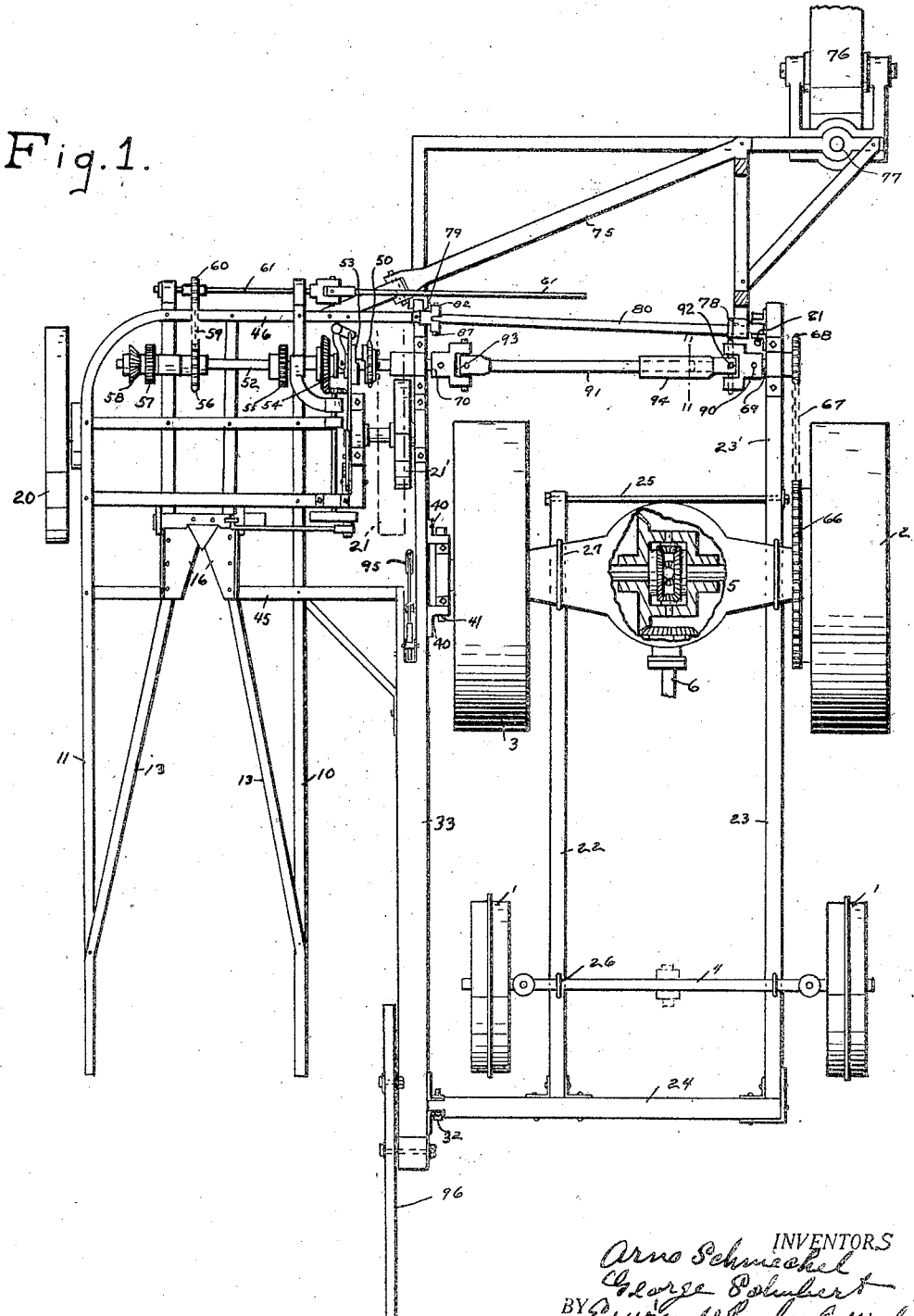
Fig. 1 is a plan view of an ordinary farm tractor with the body portion, including the motor, removed to show the detachable sub-frame and with a corn harvesting machine detachably connected with said sub-frame and operatively connected with the rear axle structure of the tractor.

Fig. 11 is a detail sectional view on line 11—11 of Fig. 1.

The motor driven vehicle and the machine to be propelled and operated thereby may be of any ordinary construction. The motor vehicle may be assumed to be a tractor of a well known type having steering wheels 1, traction wheels 2 and 3, supporting front axle 4 and rear axle housing 5, enlarged in its central portion to receive an ordinary differential gear set driven from the engine through the transmission shaft 6.

The auxiliary machine to be propelled and driven from the tractor is illustrated as a corn harvesting machine and may also be assumed to be a machine of ordinary type having longitudinally extending frame bars 10 and 11 connected by suitable cross bars and supporting as main elements the gatherers 13, stalk cutters 16, supporting table 17 and elevator 18. Where a binder is used it is connected with the posts 19. The harvester wheel 20 is illustrated in Fig. 1. The bull-wheel 21 is indicated in dotted lines, this wheel being removed when the harvester is driven from the tractor in accordance with the invention herein disclosed. When the bull-wheel is removed, a small supporting wheel 21' is preferably substituted to support that side of the harvester frame from the ground preparatory to connecting it with the tractor. In ordinary harvesters the bull-wheel is mounted on a vertically adjustable stub axle and the substitute supporting wheel 21' will therefore be also vertically adjustable, since it is mounted on the same axle.

An auxiliary subframe comprising longitudinally extending bars 22 and 23, connected at the front by a cross bar 24 and at the rear by a rod 25, is detachably secured to the axle members 4 and 5 by yoke-shaped hangers 26 and 27 which pass over the respective axle members and downwardly through the bars 22 and 23. The lower ends of these hangers are threaded to receive suitable clamping nuts 29.

Figure 3:
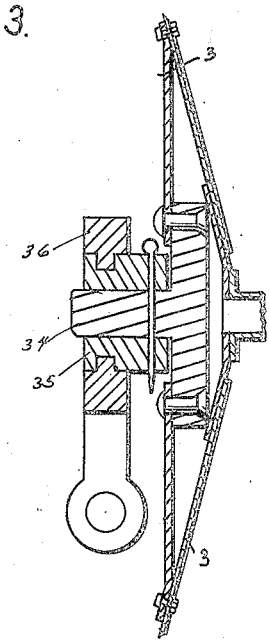
Fig. 3 is a view in vertical section showing a fragment of one of the tractor wheels and associated axle provided with a connecting member through which the auxiliary machine may be propelled.
Figure 4:
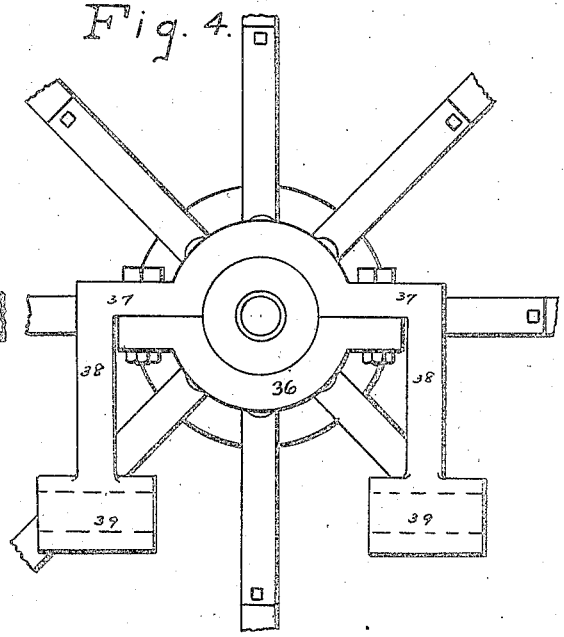
Fig. 4 is a view in side elevation of the parts shown in Fig. 3.
Figure 5:
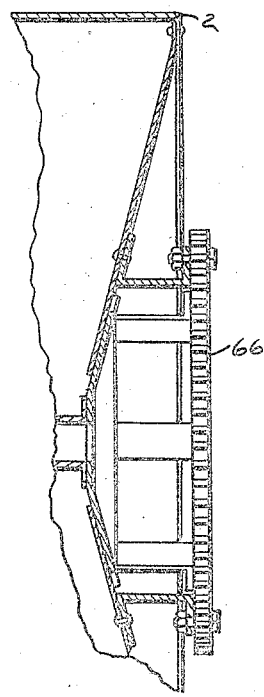
Fig. 5 is a fragmentary view in vertical section showing the other tractor wheel provided with driving connections for the working parts of the auxiliary machine.
Figure 6:
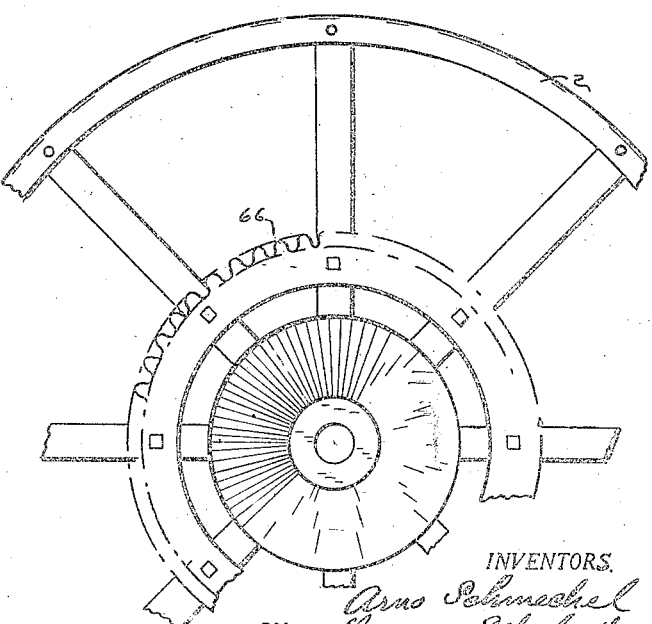
Fig. 6 is a view of the same parts in side elevation.

At the front the cross bar 24 is pivotally and detachably connected at 32 to a connecting member or beam 33 which extends rearwardly between the tractor and the auxiliary machine (corn harvester) and may be regarded as a side bar of the harvester frame. In the construction shown, the connecting member or beam 33 is also supported from a special form of tractor wheel hub 34 by bearing members 35 and 36 (Figs. 3 and 4), having extended clamping arms 37 provided with depending hangers 38 which are provided with pivot bearings 39 at their lower ends. Brackets 40 connected with the beam 33, receive the pivot bearings 39, to which they are connected by pivot pins or bolts 41. The aligned pivotal connections at 41 and 32 allow relative movement of the beam 33 and the associated harvesting machine about these pivotal axes, whereby both the driving and driven machines are allowed free movement in accordance with inequalities of the ground without transferring load to the other machine or subjecting it to strains such as would otherwise be transmitted.

The beam 33 is connected with the cross bar members 45 and 46 of the harvester frame, whereby such frame may be supported on that side from the tractor wheel 3, with the wheel 21' out of contact with the ground.

Figure 2:
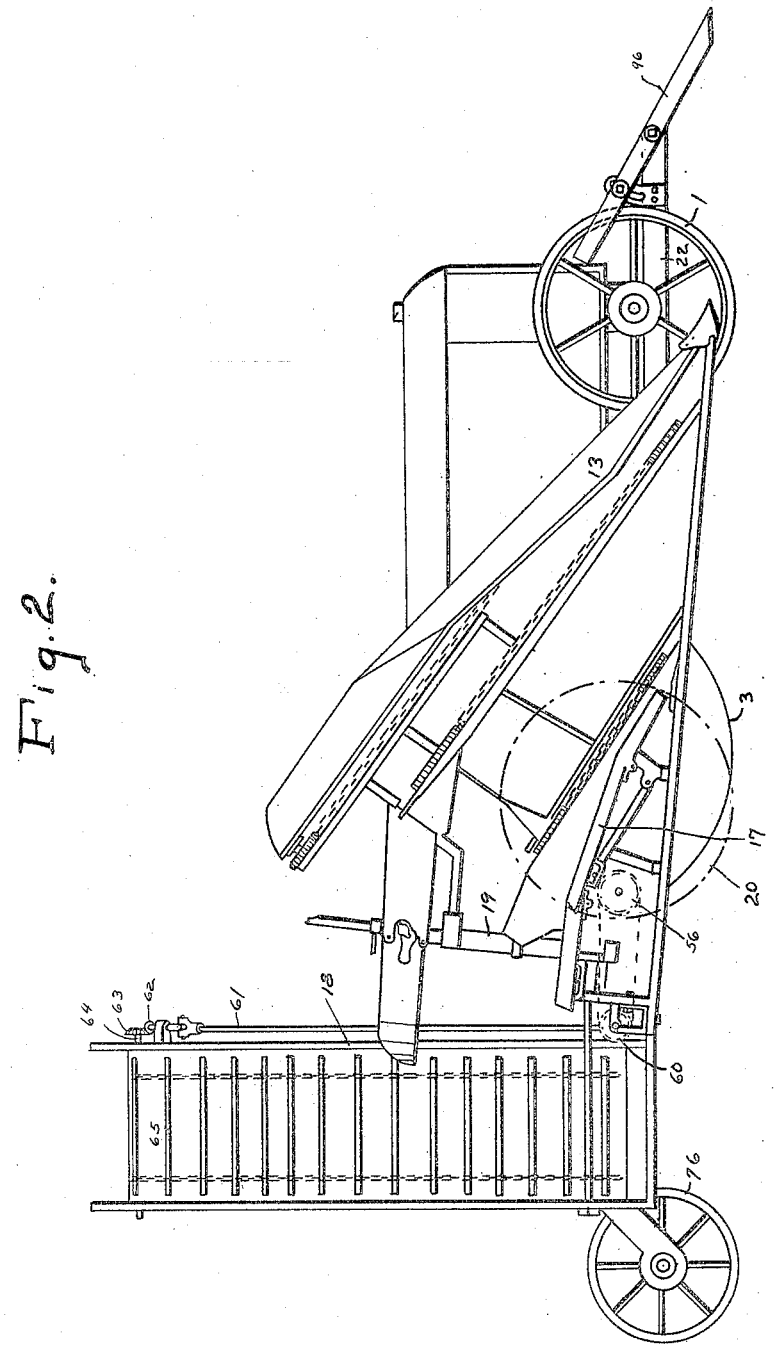
Fig. 2 is a side elevation of a combined tractor and corn harvesting machine embodying our invention.

The sprocket wheel 50 of the harvesting machine is normally actuated from the bull-wheel 21, through a sprocket wheel 51 and chain 51' (Figure 9). The sprocket wheel 50 is mounted upon a rotary shaft 52 and transmits motion to the gathering chains and other driven parts of the harvesting machine through the clutch 53 and gear members 54, 55, 56, 57 and 58. The functions of these gear members are not material to the invention herein disclosed and therefore it is deemed unnecessary to illustrate or describe their associated motion transmitting connections through which they actuate the gathering chains and binder mechanism of the harvester. It may be stated, however, that the sprocket wheel 56 actuates the elevator through sprocket chain 59, pinion 60, flexibly jointed shaft 61, beveled pinion 62 (Fig. 2) and beveled gear wheel 63 mounted on the upper shaft 64 which supports the conveyor apron 65 of the elevator.

When the bull-wheel 21 is removed from the harvesting machine and the beam 33 of the latter secured to the harvester frame and connected by the pivot bolts 32 and 41 with the tractor, motion may thereupon be transmitted to the shaft 52 from the outer wheel 2 of the tractor through the sprocket wheel 66, chain 67, sprocket pinion 68 and the universally jointed shaft 69, the latter being connected by coupling shaft 70 end to end with the shaft 52. When this is done the sprocket wheel 50 is of course idle, its driving connection with the bull-wheel 21 being removed. It will be observed that the shaft 69 is journaled in an extended end portion 23' of the detachable tractor subframe, and it will also be observed that the shaft 70 is journaled in the correspondingly extended end portion of the beam 33.

To support the elevator 18 we preferably employ an auxiliary frame 75 having a supporting wheel 76 in caster connection with the frame at 77. This auxiliary frame is pivotally connected with the extension 23' of the said frame bar at 78 and with the rear end of the beam 33 at 79. A spacing rod 80 is pivotally connected with the extension member 23' at 81 and with the beam 33 at 82. These pivotal connections at 81 and 82 are quick detachable, each of the pivot bolts being held in position by a cotter pin or equivalent fastening 87 which may be readily withdrawn when it is desired to disconnect the harvesting machine from the tractor or the elevator from the harvesting machine.

Similarly, the pivotal connections of the beam 33 with the tractor at 32 and 41 are made quick detachable and this is also true of the coupling shaft 70 and the coupling 90, whereby the knuckle jointed section 91 may be removed, thus allowing a separation of the tractor from the harvester without removing the auxiliary subframe from the tractor. The shaft section 91 is not only provided with double knuckle or universal joints at 92 and 93 but it is also provided with a telescopic or slip joint at 94 which allows relative longitudinal movement of the parts although adapted to transmit rotative movement. When it is desired to remove the latter, the clamping nuts 29 will be unscrewed and the sprocket chain 67 disconnected. If the auxiliary subframe is removed, the tractor is restored to normal condition, except that it will differ from an ordinary tractor in the fact that it has a sprocket wheel 66 secured to one of its wheels.

The beam 33 may be utilized as a support for a pick up finger 35 to raise fallen stalks from in front of the tractor in advance of the gatherers 13, which might not reach such stalks in time to prevent them from being reached by the front wheels of the tractor. This beam 33 also supports the adjusting lever 95 by which the gatherers are tilted. Levers for this purpose are commonly used in corn harvesters but this invention makes it possible to support such a lever within easy reach from the operator's seat on the tractor.

Heretofore, attempts have been made to connect an auxiliary machine at one side of a tractor, and drive it from an engine driven pulley on the opposite side. This does not utilize the differential movements provided for by the rear axle differential gear set, and does not balance in whole or in part, the resistance imposed on the tractor tending to cause it to move in an arc, including the tendency to hold one of the tractor wheels in a stationary position or retard its movement.

While we have shown and described our invention as applied to a corn harvesting machine connected with and driven from a tractor, we do not intend to limit its scope and use to the corn harvesting art, it being obvious that any auxiliary machine, such for example, as a loading or ditching machine, or a grain harvesting machine might be similarly connected and operated by the use of our invention.

We claim:—

1. A supporting and driving attachment for tractors comprising the combination of an auxiliary frame adapted to be detachably connected with the tractor axles, a beam pivotally hung from said frame and from one of the tractor wheels and adapted to support one side of an auxiliary machine frame, a driving gear connected with the opposing tractor wheel, and associated power transmitting mechanism journaled in said detachable frame and extending transversely of the tractor and said connecting beam and provided with coupling means, whereby it may be operatively connected with power operated mechanism on the auxiliary machine.

2. A supporting and driving attachment for tractors comprising an auxiliary frame adapted to be detachably connected with the tractor, means for supporting an auxiliary machine in part from said frame and in part from one of the traction wheels of the tractor, said supporting means including pivot members aligned in a longitudinal vertical plane, and power transmitting connections arranged to be driven from the opposing traction wheel of the tractor and adapted to be detachably connected with power operated mechanism carried by an auxiliary machine.

3. A supporting and driving attachment for tractors comprising the combination of a supporting coupling member adapted to be detachably connected with one of the traction wheels of the tractor for supporting one side portion of an auxiliary machine, and detachable power transmitting connections for the auxiliary machine, adapted to be operatively connected with the other traction wheel of the tractor.

4. The combination with a tractor having differentially driven tractor wheels, of a supporting connection for an auxiliary machine associated with one of the tractor wheels, and power transmitting connections for the auxiliary machine, operatively connected with the other traction wheel.

5. In a supporting and driving attachment for tractors the combination of a hub adapted to be secured to one of the traction wheels of a tractor, a hanger journaled on said hub and provided with depending pivot bearings, means for pivotally connecting the frame of an auxiliary machine with said pivot bearings to allow independent tilting movements of said machine and the tractor, and power connections adapted to transmit motion from the opposing traction wheel to mechanism carried by the auxiliary machine.

6. A supporting and driving attachment for tractors having differentially intergeared axle elements, said attachment comprising a frame provided with means for its connection with one of said elements to receive support and translative movement therefrom, and a power driven mechanism supported from said frame and provided with motion transmitting connections arranged to receive power from the other of said elements, whereby the drag of said frame on said first mentioned element will be opposed by the load of said mechanism on said last mentioned element.

7. In a device of the character described, the combination with a vehicle including differentially intergeared driving wheels, of a vehicle attachment connected at the side of said vehicle for travel therewith, an operating part mounted on said attachment, and power transmitting connections operative to connect said part with the wheel of said vehicle opposite to said attachment, whereby the resistance to movement of said attachment and the consequent drag on the side of the vehicle at which said attachment is connected will be opposed by a drag on the opposite side of said vehicle consequent upon the power required for the operation of said part.

8. The combination with a tractor having traction wheels, one provided with a hub journal and the other provided with a driving gear wheel, a coupling member suspended from said journal, a co-operating coupling member connected with the front end portion of the tractor, a supporting beam for an auxiliary machine pivotally connected with said coupling members, and power transmitting connections for the auxiliary machine operatively connected with said driving gear wheel.

9. A supporting and driving attachment for tractors comprising the combination with the traction wheel and an associated axle member at one side of the tractor, of a coupling member having a journal supported by said tractor wheel with its axis in line with that of the axle member, a driving gear wheel connected with the other traction wheel and its associated axle member to be actuated thereby, a frame bar connected with the tractor and extending transversely across the path of one front wheel on the side occupied by said coupling member, a beam pivoted to said frame bar and to said coupling member and adapted to constitute part of the frame of an auxiliary machine to be driven by the tractor, another frame bar extending rearwardly from the tractor and co-operating with the rear end portion of said beam to support transversely disposed motion transmitting connections for the auxiliary machine, and means for transmitting motion from said gear wheel to said transversely disposed motion transmitting connections, whereby the auxiliary machine may be supported from the tractor at one side thereof and driven from a traction wheel at the opposite side thereof.

10. The combination with the traction wheel of a tractor, of a journal bearing projecting axially therefrom, a non-rotatable coupling member journaled thereon and provided with depending arms laterally offset at their lower ends and provided with pivotal bearings, a supporting beam for an auxiliary machine pivotally connected with said bearings and also supported from the front end of the tractor, and power transmitting connections for an auxiliary machine operatively connected with the opposing traction wheel of the tractor.

11. A supporting and driving attachment for tractors comprising the combination with a tractor frame, of a detachable sub-frame having members extending forwardly and rearwardly from the tractor, a laterally extending support associated with the forward end of said sub-frame, a supporting beam for an auxiliary machine pivotally connected with said support and extending along the outer side of the wheels at one side of the tractor, means for utilizing the associated tractor wheel and axle to support the rear end portion of said beam, driving connections supported by said beam and rearwardly projecting portion of the said frame, and means for actuating said driving connections from the opposing traction wheel of the tractor.

12. A supporting and driving attachment of tractors comprising the combination with a tractor frame, of a detachable sub-frame having members extending forwardly and rearwardly from the tractor, a laterally extending support associated with the forward end of said sub-frame, a supporting beam for an auxiliary machine pivotally connected with said support and extending along the outer side of the wheels at one side of the tractor, means for utilizing the associated tractor wheel and axle to support the rear end portion of said beam, driving connections supported by said beam and rearwardly projecting portion of the said frame, means for actuating said driving connections from the opposing traction wheel of the tractor, and an elevator frame supported in part from said beam and sub-frame and provided with a wheeled support substantially in line with the traction wheel which drives said motion transmitting connections.

13. A supporting and driving attachment for tractors comprising two frame members, one connected with the axle members of the tractor between its wheels and one in flexibly jointed connection with the tractor beyond the tractor wheels along one side thereof, a flexibly jointed motion transmitting shaft journaled in the rear end portions of said frame member and differing sections detachably connected, means for driving said shaft from one of the traction wheels and associated axle member of the tractor, and means associated with said flexible shaft for driving an auxiliary machine.

14. A supporting and driving attachment for tractors comprising two frame members, one connected with the axle members of the tractor between its wheels and one in flexibly jointed connection with the tractor beyond the tractor wheels along one side thereof, a flexibly jointed motion transmitting shaft journaled in the rear end portions of said frame member and differing sections detachably connected, means for driving said shaft from one of the traction wheels and associated axle member of the tractor, and means associated with said flexible shaft for driving an auxiliary machine, said flexibly jointed beam being located on the opposite side of the tractor from the traction wheel which drives the flexibly jointed shaft.

15. A supporting and driving attachment for tractors comprising a beam pivotally connected with the tractor along one side thereof, a flexibly jointed shaft having one member journaled in said beam and extending across the rear end of the tractor, means associated with the traction wheel and its axle member on the opposite side of the tractor for driving said shaft.

16. A supporting and driving attachment for tractors comprising a beam pivotally connected with the tractor along one side thereof, a flexibly jointed shaft having one member journaled in said beam and extending across the rear end of the tractor, means associated with the traction wheel and its axle member on the opposite side of the tractor for driving said shaft, said shaft being provided with a clutch member to operatively connect it with the motion transmitting connections of an auxiliary machine.

17. The combination with a tractor, of an auxiliary machine pivotally connected with the tractor near the front and rear ends thereof and provided with a transversely disposed shaft and operating connections for the auxiliary machine, a flexible shaft extending transversely of the tractor at the rear thereof and adapted to be operatively connected to drive the first mentioned shaft, and means for driving said flexible shaft from the traction wheel of the opposite side of the tractor.

18. In a device of the character described, the combination with a tractor including a pair of differentially intergeared driving wheels, of an attachment including a relatively movable part connected for translation with one of said wheels, and connected for its independent operation with the other of said wheels.

ARNO SCHMECHEL..
GEORGE SCHUBERT.